(12) United States Patent
Barak et al.

(10) Patent No.: US 8,605,687 B2
(45) Date of Patent: Dec. 10, 2013

(54) METHOD FOR CHANNEL ESTIMATION IN A POINT-TO-POINT COMMUNICATION NETWORK

(75) Inventors: Oz Barak, Hod Hasharon (IL); Assaf Touboul, Natanya (IL); Guy Wolf, Petach Tikva (IL)

(73) Assignee: Qualcomm Incorporated, San Diego, CA (US)

( * ) Notice: Subject to any disclaimer, the term of this patent is extended or adjusted under 35 U.S.C. 154(b) by 1353 days.

(21) Appl. No.: 11/773,452

(22) Filed: Jul. 5, 2007

(65) Prior Publication Data

US 2009/0010238 A1 Jan. 8, 2009

(51) Int. Cl.
*H04B 7/216* (2006.01)
*H04K 1/10* (2006.01)

(52) U.S. Cl.
USPC .............................. 370/335; 370/342; 375/260

(58) Field of Classification Search
USPC .................................. 370/335, 342; 375/260
See application file for complete search history.

(56) References Cited

U.S. PATENT DOCUMENTS

| | | | |
|---|---|---|---|
| 2001/0031646 A1* | 10/2001 | Williams | 455/560 |
| 2004/0179469 A1* | 9/2004 | Attar et al. | 370/208 |
| 2007/0040704 A1* | 2/2007 | Smee et al. | 340/981 |
| 2007/0195899 A1* | 8/2007 | Bhushan et al. | 375/260 |

\* cited by examiner

*Primary Examiner* — Kent Chang
*Assistant Examiner* — Chaycee Bibbee (57) ABSTRACT

A method of using pilot signals in a wireless communication network including encoding pilot signals, and transmitting the encoded pilot signals over an in-band backhaul link between two nodes in the network. Preferably, the pilot signals are encoded with a CDMA codeword associated with a link. The pilot signals can be decoded to permit estimation of a channel and interference attributable to each link.

28 Claims, 6 Drawing Sheets

Fig. 1

|  | OfdmSymbol0 | OfdmSymbol1 |
|---|---|---|
| sub-carrier0 | D | D |
| sub-carrier1 | P(1) | D |
| sub-carrier2 | D | D |
| sub-carrier3 | D | D |
| sub-carrier4 | D | D |
| sub-carrier5 | D | D |
| sub-carrier6 | D | D |
| sub-carrier7 | D | P(2) |
| sub-carrier8 | D | D |
| sub-carrier9 | D | D |
| sub-carrier10 | P(3) | D |
| sub-carrier11 | D* | D |
| sub-carrier12 | D | D |
| sub-carrier13 | D | D |
| sub-carrier14 | D | D |
| sub-carrier15 | D | D |
| sub-carrier16 | D | P(4) |
| sub-carrier17 | D | D |
| sub-carrier18 | D | D |
| sub-carrier19 | P(5) | D |
| sub-carrier20 | D | D |
| sub-carrier21 | D | D |
| sub-carrier22 | D | D |
| sub-carrier23 | D | D |
| sub-carrier24 | D | D |
| sub-carrier25 | D | P(6) |
| sub-carrier26 | D | D |
| sub-carrier27 | D | D |
| sub-carrier28 | P(7) | D |
| sub-carrier29 | D | D |
| sub-carrier30 | D | D |
| sub-carrier31 | D | D |
| sub-carrier32 | D | D |
| sub-carrier33 | D | D |
| sub-carrier34 | D | P(8) |
| sub-carrier35 | D | D |

Figure 2

| C1 | X(1) | X(1) | X(1) | X(1) | X(1) | X(1) | X(1) | X(1) |
|----|------|------|------|------|------|------|------|------|
| C2 | X(1) | X(1) | X(1) | X(1) | X(2) | X(2) | X(2) | X(2) |
| C3 | X(1) | X(1) | X(2) | X(2) | X(2) | X(1) | X(1) | X(2) |
| C4 | X(1) | X(2) | X(2) | X(1) | X(1) | X(2) | X(1) | X(2) |
| C5 | X(1) | X(2) | X(1) | X(2) | X(1) | X(1) | X(2) | X(2) |
| C6 | X(2) | X(2) | X(1) | X(1) | X(2) | X(1) | X(1) | X(2) |
| C7 | X(2) | X(1) | X(1) | X(2) | X(1) | X(2) | X(1) | X(2) |
| C8 | X(2) | X(1) | X(2) | X(1) | X(1) | X(1) | X(2) | X(2) |

Fig. 3

| C1 | X(1) | X(1) | X(1) | X(1) | X(1) | X(1) | X(1) | X(1) |
|----|------|------|------|------|------|------|------|------|
| C2 | X(1) | X(1) | X(1) | X(1) | X(3) | X(3) | X(3) | X(3) |
| C3 | X(1) | X(1) | X(3) | X(3) | X(4) | X(3) | X(1) | X(2) |
| C4 | X(1) | X(1) | X(3) | X(3) | X(2) | X(1) | X(3) | X(4) |
| C5 | X(1) | X(3) | X(3) | X(1) | X(4) | X(1) | X(3) | X(2) |
| C6 | X(1) | X(3) | X(1) | X(3) | X(2) | X(4) | X(4) | X(2) |
| C7 | X(1) | X(3) | X(3) | X(1) | X(2) | X(3) | X(1) | X(4) |
| C8 | X(1) | X(3) | X(1) | X(3) | X(4) | X(2) | X(2) | X(4) |

Fig. 4

| C1 | X(1) | X(1) | X(1) | X(1) | X(1) | X(1) | X(1) | X(1) |
|----|------|------|------|------|------|------|------|------|
| C2 | X(1) | X(1) | X(1) | X(1) | X(4) | X(4) | X(4) | X(4) |
| C3 | X(1) | X(1) | X(4) | X(4) | X(5) | X(4) | X(1) | X(2) |
| C4 | X(1) | X(1) | X(4) | X(4) | X(2) | X(1) | X(4) | X(5) |
| C5 | X(1) | X(4) | X(4) | X(1) | X(5) | X(1) | X(4) | X(2) |
| C6 | X(1) | X(4) | X(1) | X(4) | X(2) | X(5) | X(5) | X(2) |
| C7 | X(1) | X(4) | X(4) | X(1) | X(2) | X(4) | X(1) | X(5) |
| C8 | X(1) | X(4) | X(1) | X(4) | X(5) | X(2) | X(2) | X(5) |

METHOD FOR CHANNEL ESTIMATION IN A POINT-TO-POINT COMMUNICATION NETWORK

BACKGROUND OF THE INVENTION

Broadband wireless is expected to be one of the main drivers of the telecommunications industry. There is a substantial increase in demand for broadband connectivity, with personal broadband being the key growth engine for mobile wireless broadband networks.

Communication in such networks is generally divided between access and backhaul. An access network is the air interface network providing traffic communication between mobile terminals (subscribers) and their associated access points (base stations), while a backhaul network is the air interface network providing traffic communication between the various base stations and a core network. The networks may be arranged to transfer data alone, as in Wi-Fi networks, or may be arranged for triple play services (video, audio and data), typically WiMax (or other competitive technology, such as 3GPP-LTE). In conventional systems, the access network and the backhaul network each require their own separate transmission equipment, antennas, etc, at great cost to the operator.

One example of a conventional backhaul network is connecting wireless base stations to corresponding core mobile networks (ASN GateWay, AAA servers, etc). The choice of backhaul technology must take into account such parameters as capacity, cost and coverage. Base station backhaul typically is performed via wired infrastructure (e.g., E1/T1 leased lines), or via wireless Point-to-point (PTP) microwave links to each base station, which is expensive to deploy (equipment and installation). In particular, due to the direct, uninterrupted line-of-sight requirements of the wireless backhaul equipment, the backhaul components of conventional base stations require strategic deployment location on high and expensive towers.

Mobile WiMAX, as defined in IEEE Standard 802.16e-2005 Standardization for WiMAX, was originally designed to provide mobile broadband access for mobile devices, i.e., broadband wireless data-optimized technology, providing carrier-grade triple play services using a variety of user devices (such as laptops, PDAs, handheld devices, smart phones, etc.). A complete mobile WiMAX Radio Access Network (RAN) requires deployment of massive infrastructure, including base station sites with high towers, base station equipment, antennas, and a separate backhaul network, as described above.

There are also known outdoor Wi-Fi networks, deployed mainly according to outdoor Wi-Fi mesh technology. The typical Wi-Fi setup contains one or more Access Points (APs), which is the equivalent terminology to Base Station in WiMax, having relatively limited range, deployed along telephone poles, street poles, electricity poles and rooftops. Due to the access point unit's smaller coverage range, a large number of access point units are required to cover a given area. Conventional outdoor Wi-Fi access point units require costly power amplifiers in each Wi-Fi AP unit to extend the coverage range. In addition, conventional Wi-Fi networks operate only on unlicensed bands and suffer from severe interference and difficult radio-planning issues.

Furthermore, in the micro/pico-cell deployment approach of conventional Wi-Fi-mesh networks, due to multiple access point nodes in the network, backhauling becomes more complicated and costly. Backhauling each node via wired lines (E1/T1 or DSL) is impractical in a dense deployment of nodes. On the other hand, backhauling each node via traditional wireless PTP microwave links is expensive due to costly equipment and installation costs and not feasible to deploy on telephone poles, street poles, electricity poles, etc. In Wi-Fi, like in WiMAX, PTP microwave links require high towers to achieve a clear line-of-sight between nodes. In addition, when the network load is increased, the backhaul network losses drastically degrade the overall network performance (capacity and latency).

In multi-hop and mesh deployments, there can be a problem of interference in backhaul transmissions between adjacent links during concurrent transmission over the same frequency band in a cluster of nodes. In this network, it is difficult to determine what is channel noise and what is interference from adjacent links, and there is no way to determine how much of the interference is caused by which link. In order to determine the interference, at present, a node must perform channel sounding. This involves stimulating the transmitter to send a signal and measuring the signal received (amplitude and phase) on each antenna. Since the channel is known, the interference can be calculated. It will be appreciated by those skilled in the art that at present, it is only possible to measure the overall results of interference on a link or node, e.g., SINR or CINR. However, these measurements do not indicate the source of the interference or the relative contributions of several interfering links near the link of interest.

Consequently, there is a long felt need for a method for interference measurement including channel estimation to permit interference mitigation in an in-band backhaul network. The resulting backhaul link would be characterized by robust point-to-point (PTP) communication conditions, in the sense of Signal to Interference and Noise Ratio (SINR) and potential throughput.

SUMMARY OF THE INVENTION

The present invention relates to a method of using pilot signals in a wireless communication network including encoding pilot signals, and transmitting the encoded pilot signals over an in-band backhaul link between two nodes in the network.

According to a preferred embodiment of the invention, the step of encoding includes encoding pilot signals with a CDMA codeword associated with a link. Preferably, the method further includes decoding encoded pilot signals associated with at least one link in the network, and estimating channel noise attributable to each link.

In particular, the invention is useful for channel and interference estimation during backhaul communication in a wireless mobile network, such as WiMAX or 3GPP-LTE, WiFi, IEEE 802.20, having multi-hop deployment, wherein the network is built from a plurality of nodes or access points providing service to a certain geographical area (a cell) and wirelessly interconnected to one another in virtual clusters. In each cluster, one access point, known as a feeder node, serves as the backhaul connection point of the whole cluster to a core network. The invention provides a method for channel estimation and calculation of interference between the various links in each cluster, utilizing CDMA encoded pilot signals embedded within an OFDMA symbol.

There is provided according to the present invention a method of channel estimation, during backhaul communication, between links in a cluster in a mobile wireless deployment including allocating one of a family of CDMA codewords to each in-band backhaul link to identify the link, encoding a pilot transmission using that codeword, receiving and decoding the encoded pilot transmission, and estimating the channel using the pilot transmission and the decoded received pilot transmission.

It will be appreciated that this deployment can be either outdoors, as on light poles and below rooftop on buildings, or indoors, to provide networking capability inside large buildings and malls.

There is further provided, according to the present invention, an interference mitigation system for a network including a plurality of nodes coupled for wireless communication in virtual clusters of nodes, each cluster including a feeder coupled to a core network, a wireless link being formed between each pair of adjacent nodes, each node including at least one, and preferably a plurality of transceivers providing mobile access communication and backhaul communication over the link; a modem coupled to each transceiver; and a plurality of antennas mounted in the node, one coupled to each transceiver, the antennas being able to provide multiple concurrent transmissions over multiple antennas; a controller in each node adapted and configured for control and coordination of the transceivers and associated modems, the interference mitigation system including: elements in a transmitter for dividing a frame of OFDMA symbols into tiles, each tile including a group of time and frequency slices, mapping CDMA-encoded pilot signals onto a selected number of such slots in each tile, mapping data signals onto the remaining slots in each tile, decoding the pilot signals in a receiver, and using the decoded pilot signals to estimate channel response over a link itself and/or to estimate interference on that link generated by other backhaul links transmitting concurrently.

According to a preferred embodiment of the invention, the method further includes providing the estimated interference response to the feeder node, and causing the feeder node to adjust backhaul link parameters of links in the cluster so as to reduce the interference caused by adjacent links.

Further according to the present invention there is provided an apparatus for channel estimation including a multiplexer for multiplexing a selected codeword from a family of CDMA codes with a pilot value assigned to a link to provide a decoding value, a multiplier for multiplying a received signal by the decoding value, and an accumulator for calculating a cross correlation product over a plurality of pilot signals so as to provide a channel estimation value.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a method of using pilot signals in a wireless communication network including a method of using pilot signals in a wireless communication network including encoding pilot signals, and transmitting the encoded pilot signals over an in-band backhaul link between two nodes in the network. Preferably, the pilot signals are encoded with a CDMA codeword associated with a link.

A preferred application of this method is for channel estimation over a link, permitting interference measurement with identification of its source, in a wireless communication system, particularly for in-band backhaul. Thus, preferably the method further includes decoding the encoded pilot signals associated with at least one link in the network, and estimating the channel noise attributable to each link. The method involves decoding encoded pilot signals associated with various links, so as to permit the isolation of channel noise from interference caused by adjacent links. In particular, the method utilizes CDMA encoding of pilot sub-carriers to provide information about the channel and interference to the various nodes.

The invention is based on a point-to-point communication method between wireless nodes in a wireless network, particularly a multi-point wireless network incorporating OFDM/OFDMA standards, such as WiMAX or 3GPP-LTE or IEEE 802.20, serving as an internal backhaul network between the various nodes, i.e., base stations, relay stations, access points, etc. For purposes of the present application, all the backhaul descriptions refer to any of these infrastructure devices. In the discussion that follows, access point units are deployed in a multi-hop relay topology, where at least one access point acts as a feeder node to a core mobile network and all other access points act as relay nodes for data relaying between the feeder and one or more mobile stations. The access point units include built-in, Point to Point backhaul. In this topology, the nodes of the network are divided into clusters, each cluster consisting of a feeder and at least one access point coupled to the feeder. For purposes of the application, a backhaul network is the air interface network providing an in-band Point to Point (PTP) wireless interconnection between access points within the network.

One backhaul network for which the methods of the present invention are particularly suitable is described in detail in a co-pending U.S. patent application Ser. No. 11/624,232, filed on Jan. 18, 2007, entitled Point-To-Point Communication Method, and Ser. No. 11/623,774, entitled Point-To-Point Communication Method with Interference Mitigation, filed on Jan. 17, 2007, both assigned to the same Assignee. In this network, each node has a single controller for controlling and coordinating access and backhaul communication and for implementing interference mitigation mechanisms. Preferably, equipment for both access communication and point to point backhaul communication is built-in in a single module. Thus, no additional, external equipment is required for backhaul communication between access points, resulting in a "zero-cost" interconnection.

The PTP communication operates over the same spectrum allocation (same frequency channel) that is used for access to the wireless subscriber terminals ("in-band" backhauling). This capability is particularly useful for deployments in licensed frequency bands, where the availability of extra spectrum for backhauling might impact the cost of deployment. With this solution, no additional separate frequency slice is required for the backhaul network, saving the costs of additional spectrum fees and frequency planning.

The present invention enables interference measurement on each link, and affects two levels of a communication network—the link level, contributing to a high capacity link between two nodes, and at the network level, providing capabilities for managing and mitigating the interference caused by other backhaul transmissions associated with such backhaul network.

Each link preferably is a high capacity point-to-point (PTP) communication channel connecting one node in the network to another node, and in backhaul, for transferring its aggregated traffic towards the core network. From the link level perspective, one of the key factors determining each link's effective SINR is the receiver's ability to accurately estimate the channel response that the desired signal encounters. In cellular systems featuring high capacity, as well as in PTP links (as the in-band backhauling), where a link may encounter interference due to concurrent transmissions on the same time\frequency resources that are utilized by the link, the receiver may take advantage of side information of concurrent interference estimations in order to increase the link SINR (e.g., by interference cancellation mechanisms).

From the system perspective, side information of interference encountered by individual links may substantially contribute to the overall system capacity optimization, as link parameters, such as antenna beams, transmission power, time\frequency resources, modulation and coding rates can be retuned for links that have been identified as polluting neighboring links with excessive interference. In other words, adaptive interference mitigation mechanisms, or interference coordination mechanisms, can be employed in the network, based on this information.

In a network utilizing OFDM or OFDMA, such as defined by IEEE 802.16e-2005 standardization (WiMAX) or 3GPP-LTE, the time and frequency resources of each frame of OFDMA symbols is divided into discrete slices, e.g., frequency bins or sub-carriers, and OFDMA symbols. In order to reduce signaling and scheduling overheads, a selected number of sub-carriers and OFDMA symbols may be grouped together as a basic unit of transmission in backhaul. This group is termed a tile.

Figure 1:
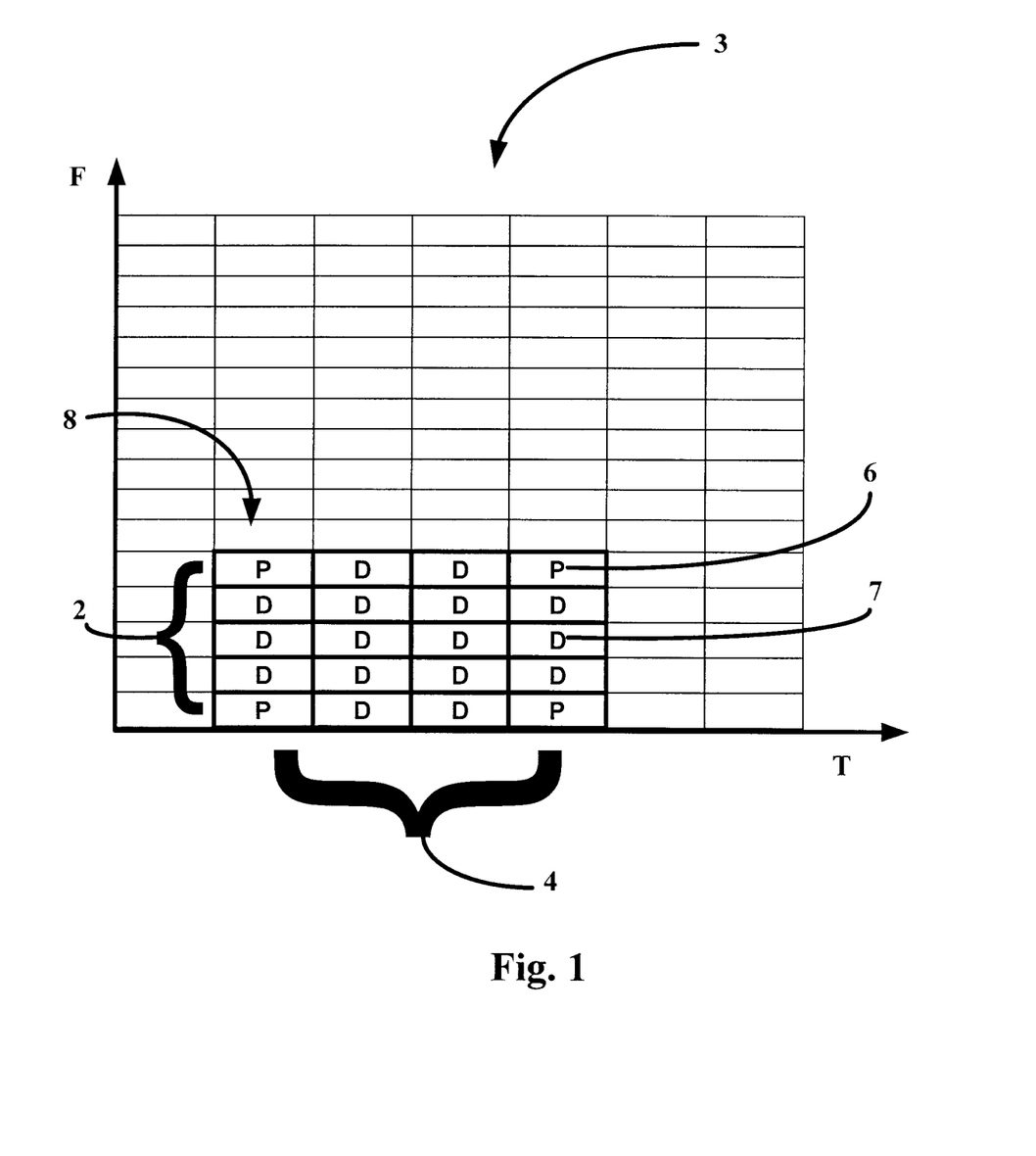
FIG. 1 is a schematic illustration of a transmission frame for transmission over a wireless network constructed and operative in accordance with one embodiment of the present invention.

Referring to FIG. 1, there is shown a schematic illustration of a tile 8 in a frame 3. The available resources in the frame are divided into discrete time T and frequency F slices (sub-carriers). Tile 8 is shown as including five frequency slices 2 holding four OFDMA symbols 4. Each tile contains both sub-carriers 7 carrying data (denoted as D) and sub-carriers 6 carrying pilot signals (denoted as P) mapped onto the time/frequency sub-carriers of the tile. Thus, when each frame is transmitted, a plurality of tiles, each holding data and pilot signals, are transmitted. Preferably, the tile permutation (dimensions of the tile and location in the tile of the pilot signals) is fixed. It will be appreciated that, once pilot signals are allocated to the tile, the tile is substantially identical in subsequent frames, except for different data (with different modulation and coding) being mapped onto the data sub-carriers 7.

For a tile with dimensions of N×M (where N is the number of sub-carriers on the frequency axis, and M is the number of OFDMA symbols in the time axis), the number of pilot sub-carriers mapped onto the tile is Lp, while the number of data sub-carriers is ([N×M]−Lp), mapped on the tile in non-overlapping locations in the frequency/time grid.

Figure 2:
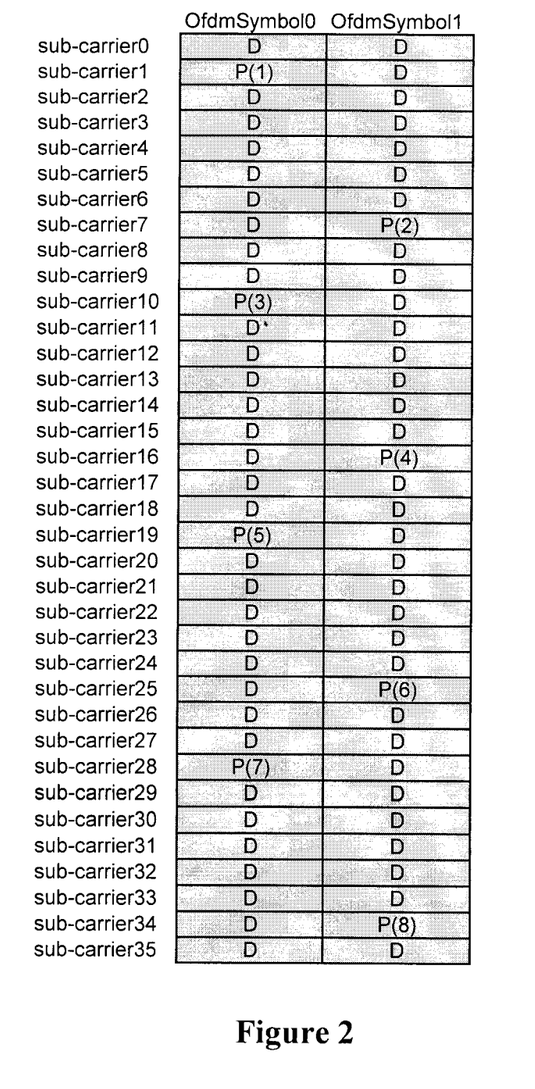
FIG. 2 is a schematic illustration of a tile constructed and operative in accordance with one embodiment of the invention.

Referring to FIG. 2, there is shown a schematic illustration of a tile 10, having dimensions of 36×2. The physical mapping is determined while taking into account the tradeoff between pilot overhead versus the required performance of the channel estimator. It will be appreciated that the pilot signal is constant within a tile, and preferably changes from tile to tile. Thus, it can be seen here that eight pilot signals have been mapped onto tile 10.

In this invention, the pilot signals are CDMA encoded and transmitted over the tile in the form of:

$$P(i)=C(n,i) \cdot p | n \in \text{AssignedCodeIndex} \quad \text{Equation 1—transmitted Pilots generation}$$

where p (the pilot value) is constant within a tile and may vary between tiles for interference whitening purposes, and C is a family of CDMA codes, for example, Walsh codes. In addition, 'i' is the index denoting pilot bin index and the code's instance index, and n denotes the codeword index that the transmission is encoded with. Thus, the AssignedCodeIndex is the pointer to the CDMA codeword allocated to a certain backhaul link. One method of generating a series of pilot values p for different tiles is by using a pseudo random binary sequence (PRBS) generator, which generates seed and instance, which are known at both ends of the link, so both the transmitter and receiver can interpret the PRBS sequence.

In one embodiment of the invention, the codeword length may be $N_{pL}$ (which is equal to the number of pilot sub-carriers in the tile), and the code base (denoted as $N_C$) is at least 2. The code base may also be considered as the pilot modulation order, whose possible constellation mappings (X) are described by Equation 2:

$$X=\exp(j*2*\pi.*[0:N_C-1]/N_C) \quad \text{Equation 2—Pilot Constellation mapping}$$

Figure 3:
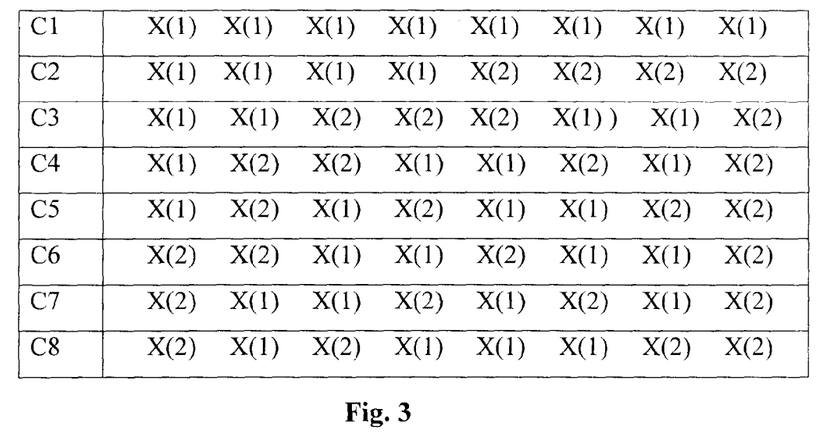
FIGS. 3, 4 and 5 are schematic illustrations of pilot constellation mappings according to the invention, with different lengths of codes.
Figure 4:
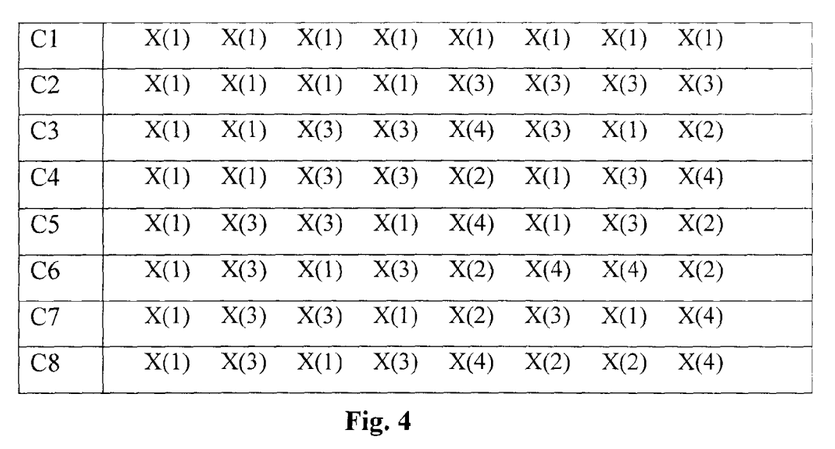
Figure 5:
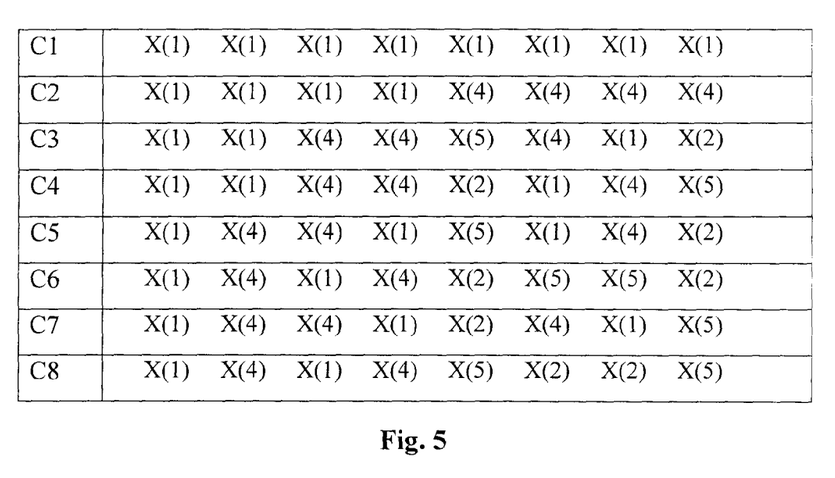

FIGS. 3-5 illustrate examples of applicable codewords and their constellation mapping according to Equation 2. Upon assignment of a CDMA codeword (Cn) to a link, the codeword is mapped into $P(1) \ldots P(N_p)$. FIG. 3 illustrates the codeword set when $N_p=8$ and $N_C=2$. FIG. 4 illustrates the codeword set when $N_p=8$ and $N_C=4$. FIG. 5 illustrates the codeword set when $N_p=8$ and $N_C=6$.

According to one embodiment of the invention, the CDMA codes are characterized as orthogonal—meaning that the cross correlation (or inner product) on any non-identical codes within a set is zero. In an alternative codeword set selection, substantial orthogonality, producing a product which is close to zero, may also be applicable.

Figure 6:
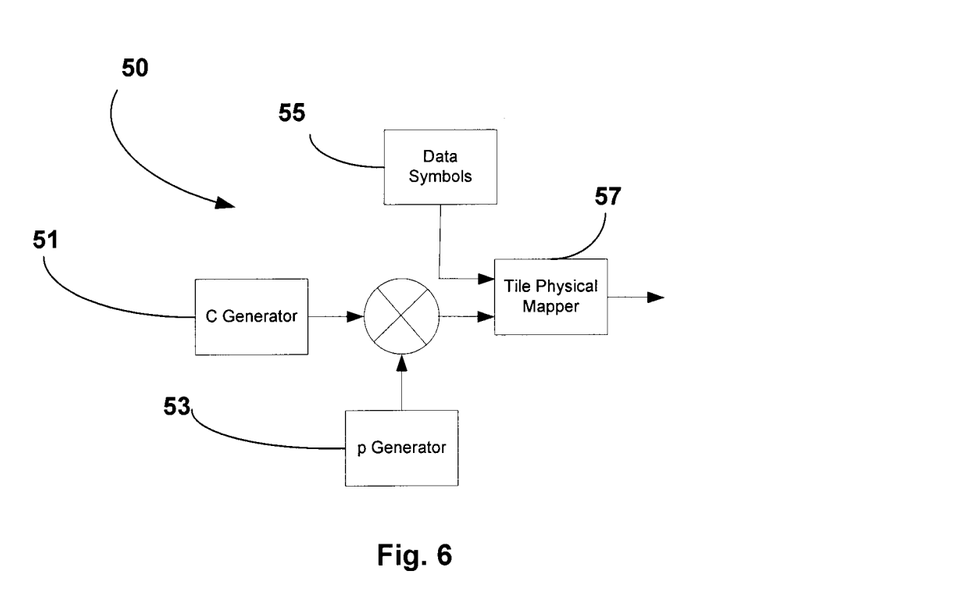
FIG. 6 is a schematic illustration of a symbol builder in a transmitter, according to one embodiment of the invention.

FIG. 6 is a schematic illustration of a symbol builder 50 in a transmitter for multiplexing data symbols and pilot symbols into a physical mapping of a tile. The 'C generator' 51 generates the pilot CDMA codeword and may be implemented, for example, as a memory block. 'p generator' 53 generates pilot values for the various tiles, and may be implemented, for example, by memory or by a PRBS machine, as it generates the common p value which is constant within a tile. The tile physical mapper 57 multiplexes the generated encoded pilot signals and the data symbols 55 onto one physical tile.

Preferably, each access point has one codeword assigned to it. In alternative embodiments of the invention, more than one access point may be identified with one codeword, or one access point may have more than one codeword assigned to it for transmitting the pilot sub-carriers. Each access point is instructed by the feeder or pre-configured regarding which code to use for each link.

One method of estimating channel response in a link is as follows. Upon an access point's entry into the network, it is assigned one or more codes for pilot CDMA coding and decoding on the appropriate link. Similarly, by means of a control announcement from the feeder, each access point is assigned one or more codes for pilot transmission, denoted as an 'AssignedCodeIndex'. In order to estimate the channel response of a particular PTP link, the access point decodes the received pilot signals using its own link's code. Since it knows the pilot signal and the codeword, it can estimate the channel response.

In one embodiment of the invention, an access point may estimate the PTP channel response of its desired backhaul link within a tile by using a mechanism described in Equation 3, where * denotes the complex conjugate operation, the AssignedCodeIndex represents the code assigned to that link, and $Pr_i$ are the received pilot symbols, retrieved from the received tile.

channel response estimation                    Equation 3

$$\hat{H} = \frac{1}{Np}\sum_{i=1}^{Np} C(n,i) * \frac{pr_i}{p} \bigg| n \in AssignedCodeIndex$$

In order to measure the interference generated by other links on this link, the access point decodes the received pilot signals using each of the codewords assigned to all the other links, and estimates, separately, the interference generated by the signals encoded with each codeword. Thus, the access point can measure the backhaul interference it encounters from several interfering links by repeating a similar operation to that described above for the channel response estimation, as described in Equation 4. In this case, the calculation is distinguished by the code index it uses, i.e., codewords assigned to links other than the selected access point.

interference response estimation                Equation 4

$$\hat{H}_{I_{mn}} = \frac{1}{Np}\sum_{i=1}^{Np} C(n,i) * \frac{pr_i}{p} \bigg| n \notin AssignedCodeIndex$$

Since the access point knows the pilot signals of each link and can identify each link by its codeword, by processing the encoded signals using each codeword independently, the access point can calculate the amount of interference affecting it that is generated by each other link. According to a preferred embodiment of the invention, this information is transmitted to the feeder of the access point's cluster, and the feeder can take appropriate action to reduce the interference.

Figure 7:
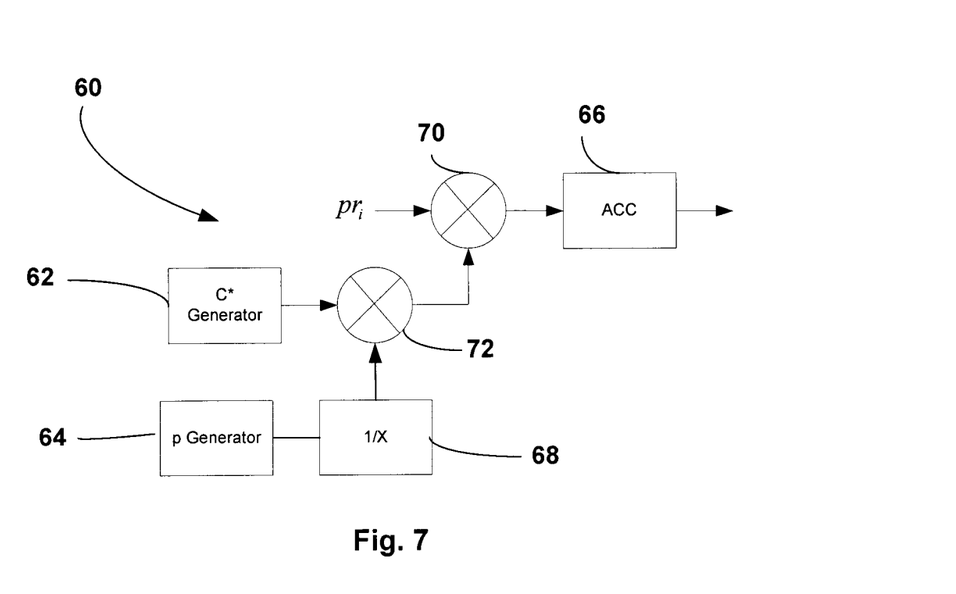
FIG. 7 is a schematic illustration of a channel or interference estimator in a receiver, according to one embodiment of the invention.

FIG. 7 is a schematic illustration of a channel estimator or interference estimator 60 in a receiver, according to one embodiment of the invention, for estimating either the channel response of the PTP link or any of the backhaul interferences acting on it. 'C* generator' 62 generates pilot CDMA codewords and may be implemented, for example, as a memory block. It may already include the complex conjugate operation (denoted as *), as well as 1/Np normalization gain factor. 'p generator' 64 generates pilot values for the various tiles, and may be implemented, for example, by memory or by a PRBS machine, as it generates the common p value which is constant within a tile. Multiplexer 72 multiplexes the output of the C* generator 62 with the output of the p generator 64 after a 1/x operation 68. ACC 66 is an accumulator which, together with the preceding multiplier 70 (whose inputs are $pr_i$ and the output of multiplexer 72), calculates the inner product operation (or cross correlation product integrator) over Np pilot signals, as described above, to provide either the desired channel response estimation (when the AssignedCode index is used by the 'C generator') or the interference estimation associated with a specific code index used by the 'C generator' (when a NonAssignedCode index is used or, in other words, when the index is not from the AssignedCode index).

The access point may later report the interference measurements to the feeder for system-wise interference management. Examples of interference reports are given below:

1. interference measurement per codeword per tile;
2. sum of all interference measurements per tile;
3. sum of all interference measurement in selected time/frequency resources;
4. interference measurement for a specific code.

In an alternative embodiment of the invention, an access point may use side information of the backhaul interference measurements to predict how the access point itself pollutes the network with interference on every tile. The access point may determine this information by utilizing channel reciprocity (in TDD systems) and can reduce its transmission power accordingly In one embodiment of the invention, multiple antennas in the transmitter and in the receiver permit multi-stream communication using Multiple In Multiple Out (MIMO) techniques for data transmission. It will be appreciated that, in such networks, a way to differentiate between pilot transmissions of each stream must be provided, so as to permit channel estimation of MIMO channel frequency spatial responses without the pilot signals canceling one another. This can be accomplished in a number of ways.

Figure 8:
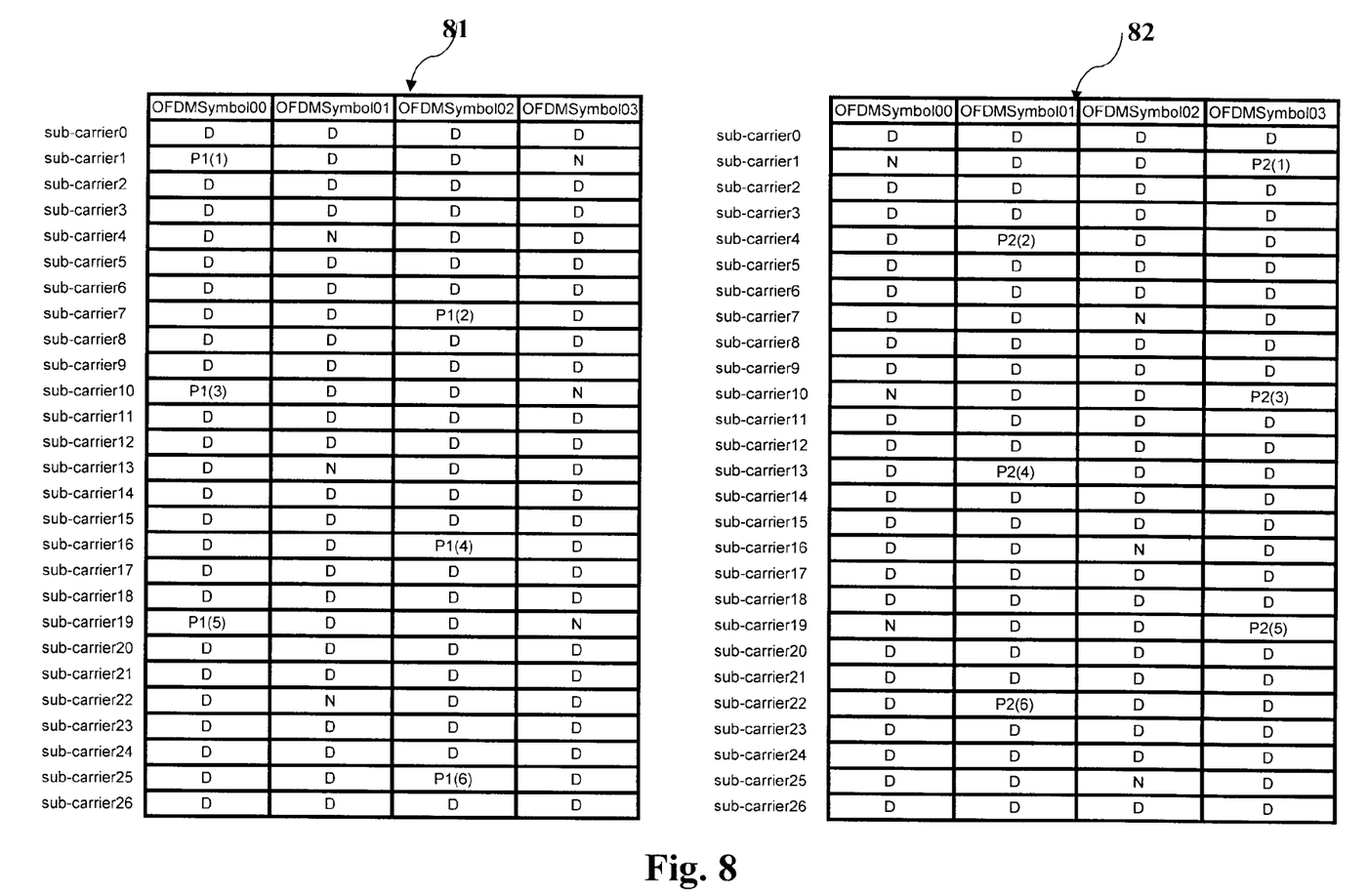
FIG. 8 is a schematic illustration of a method for pilot resource nulling, according to one embodiment of the invention.

In one embodiment, where the PTP link uses MIMO (i.e., multiple streams of data), pilots for every stream can be transmitted by time/frequency division multiplexing, implying that each antenna group transmitting a stream transmits its own pilots, on one unique time/frequency allocation within the tile, while the pilots dedicated to the complementary streams are nulled. One example of such nullification is shown schematically in FIG. 8. FIG. 8 shows two streams 81 and 82, which are transmitted concurrently. P1(n) indicates the pilot sub-carriers that are transmitted for the first stream 81, whereas P2(n) indicates the pilot sub-carriers that are transmitted for the second stream 82, and n indicates sub-carriers that are nulled by this pilot sharing. In this case, P1 and P2 may share the same code.

Figure 9:
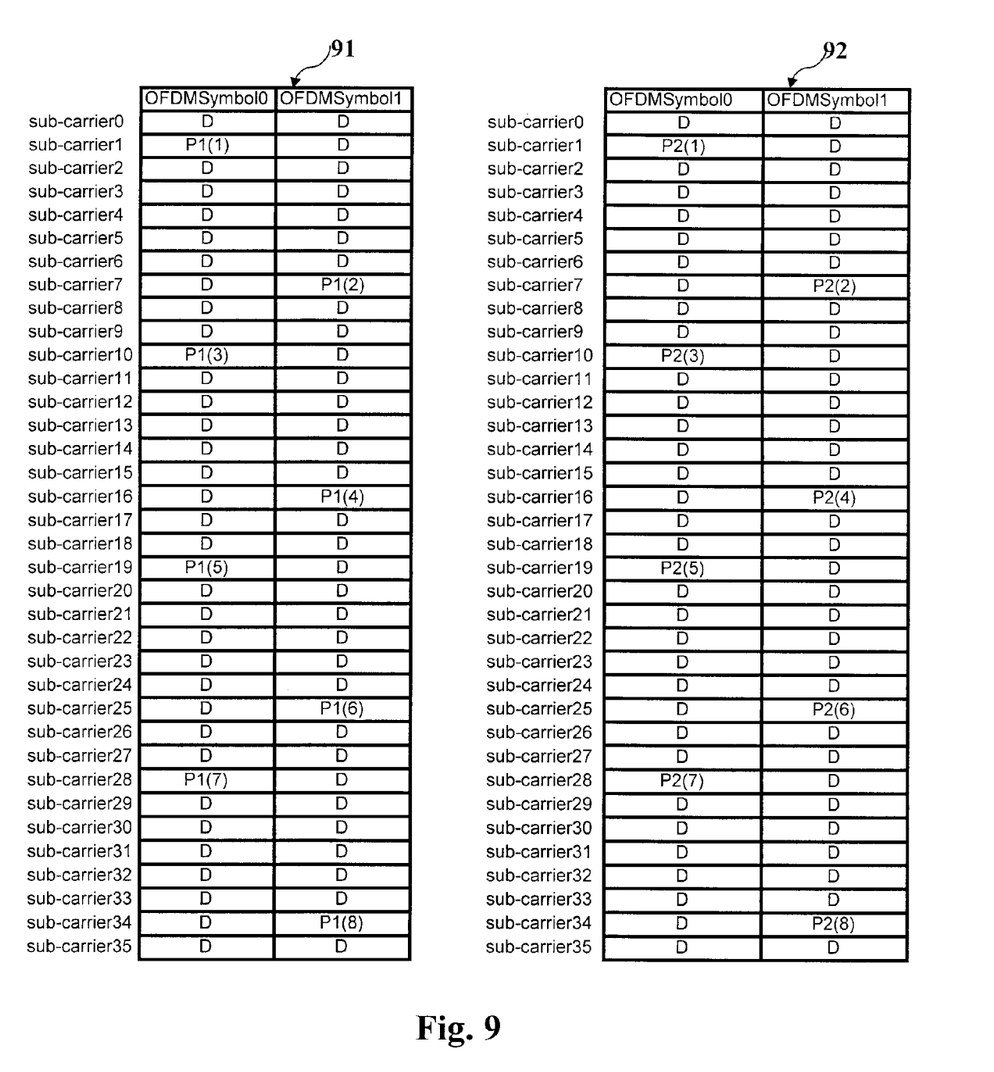
FIG. 9 is a schematic illustration of method for pilot resource sharing, according to one embodiment of the invention.

In another embodiment, an alternative MIMO pilot scheme is used. Where K MIMO streams are utilized in a PTP link, K codes may be assigned per link, hence the pilots of all streams may share the same time/frequency allocation within the tile, but will use different codes. FIG. 9 illustrates the sharing of codes described herein, where 91 and 92 are MIMO streams, and P1(n) and P2(n) indicate the pilot sub-carriers. This scheme, therefore, reduces the pilot overhead and improves the spectral efficiency of the PTP link.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A method for estimating interference in a wireless communication network comprising a plurality of wireless Orthogonal Frequency Division Multiplexing/Orthogonal Frequency Division Multiple Access (OFDM/OFDMA) backhaul links, the method comprising:

associating each of said wireless OFDM/OFDMA backhaul links with one codeword from a set of Code Division Multiple Access (CDMA) codewords to identify said link;

receiving, over a channel of a first one of said wireless OFDM/OFDMA backhaul links associated with an access point, a pilot transmission encoded using a CDMA codeword associated with a second one of said wireless OFDM/OFDMA backhaul links, wherein said encoded pilot transmission is embedded within an OFDMA symbol;

decoding said received pilot transmission using said CDMA codeword associated with said second wireless OFDM/OFDMA backhaul link; and estimating interference from said second wireless OFDM/OFDMA backhaul link on said first wireless OFDM/OFDMA backhaul link based on said decoded pilot transmission.

2. The method of claim 1, wherein said interference comprises interference from said second wireless OFDM/OFDMA backhaul link during concurrent transmission with said first wireless OFDM/OFDMA backhaul.

3. The method according to claim 1, further comprising:
dividing a frame of OFDMA symbols into tiles, each tile including a group of time and frequency slices;
mapping a plurality of CDMA-encoded pilot transmissions onto a selected number of said time and frequency slices in each tile; and
mapping data signals without CDMA encoding onto remaining OFDMA slots in each tile.

4. The method of claim 1, further comprising:
receiving a second pilot transmission encoded using a CDMA codeword associated with said first wireless OFDM/OFDMA backhaul link;
decoding said second received pilot transmission using said CDMA codeword associated with said first wireless OFDM/OFDMA backhaul link; and
estimating a channel response of said channel based on said decoded second received pilot transmission.

5. The method of claim 4, wherein said estimating said channel response of said channel comprises calculating $\hat{H}$ for said channel by:

$$\hat{H} = \frac{1}{Np} \sum_{i=1}^{Np} C(n, i) * \frac{pr_i}{p}$$

where $\hat{H}$ denotes said channel response, * denotes a complex conjugate operation, n represents a codeword from said family of CDMA codewords assigned to a link, $Pr_i$ are received pilot transmissions, and Np is a number of pilot sub-carriers per resource block and a length of said codeword.

6. The method of claim 1, wherein said first and second wireless OFDM/OFDMA backhaul links are associated with a cluster of access points.

7. The method of claim 6, further comprising:
receiving a plurality of pilot transmissions at said access point, each said pilot transmission associated with a different wireless OFDM/OFDMA backhaul link within said cluster; and
decoding said received pilot transmissions using each of said CDMA codewords assigned to one of said OFDM/OFDMA backhaul links within said cluster.

8. The method of claim 7, further comprising:
separately estimating an interference attributable to each OFDM/OFDMA backhaul link within said cluster based on said decoded received pilot transmissions.

9. The method of claim 6, further comprising:
transmitting information regarding said estimated interference attributable to at least one other OFDM/OFDMA backhaul link within said cluster to a feeder node of said cluster.

10. The method of claim 9, further comprising:
causing said feeder node to adjust backhaul link parameters of at least one OFDM/OFDMA backhaul link within said cluster based on said estimated interference.

11. The method of claim 1, wherein said network comprises at least one or more of: a WiMAX network, an LTE network, a WLAN network, or an IEEE 802.20 network.

12. A method for estimating a channel of a selected backhaul link in a wireless communication network including a plurality of wireless Orthogonal Frequency Division Multiplexing (OFDM)/Orthogonal Frequency Division Multiple Access (OFDMA) backhaul links, the method comprising:
allocating one of a family of Code Division Multiple Access (CDMA) codewords to each of said wireless OFDM/OFDMA backhaul links to identify said link;
encoding a pilot transmission using said codeword;
transmitting said CDMA-encoded pilot transmission embedded in an OFDMA symbol over the channel of the selected wireless OFDM/OFDMA link;
receiving and decoding said encoded pilot transmission; and
estimating said channel using said pilot transmission and said decoded received pilot transmission,
wherein said step of estimating includes calculating the channel $\hat{H}$ by $$\hat{H} = \frac{1}{Np} \sum_{i=1}^{Np} C(n, i) * \frac{pr_i}{p}$$

where * denotes a complex conjugate operation, n represents a codeword, from said family of CDMA codewords, assigned to a link, $Pr_i$ are the received pilot signals, and Np is a number of pilot sub-carriers per resource block and a length of said codeword.

13. An access point apparatus in a wireless communication network comprising a plurality of wireless Orthogonal Frequency Division Multiplexing/Orthogonal Frequency Division Multiple Access (OFDM/OFDMA) backhaul links, the apparatus comprising:
a memory configured to associate each of said wireless OFDM/OFDMA backhaul links with one codeword from a set of Code Division Multiple Access (CDMA) codewords to identify said link;
a receiver configured to receive, over a channel of a first one of said wireless OFDM/OFDMA backhaul links, a pilot transmission encoded using a CDMA codeword associated with a second one of said wireless OFDM/OFDMA backhaul links, wherein said encoded pilot transmission is embedded within an OFDMA symbol;
a decoder configured to decode said received pilot signal using said CDMA codeword associated with said second wireless OFDM/OFDMA backhaul link; and
an interference estimator configured to estimate interference of said second wireless OFDM/OFDMA backhaul link on said first wireless OFDM/OFDMA link based on said decoded pilot transmission.

14. An apparatus for channel estimation comprising:
a transmitter configured to transmit wireless data over a multiple input multiple output (MIMO) backhaul link;
a symbol builder in said transmitter, the symbol builder including:
  a multiplexer configured to multiplex a first codeword associated with a first stream from a family of Code Division Multiple Access (CDMA) codes with a pilot value assigned to said first stream and multiplex a second codeword associated with a second stream from the family of CDMA codes with a pilot value assigned to said second stream; and
  a tile physical mapper configured to map data symbols without CDMA encoding with said multiplexed coded first pilot value and said multiplexed coded second pilot value onto an Orthogonal Frequency Division Multiple Access (OFDMA) frame;
wherein the transmitter is configured to transmit the first multiplexed coded pilot value and the second multiplexed coded pilot values over the same MIMO backhaul link in the OFDMA frame.

15. The apparatus according to claim 14, further comprising a channel estimator in a receiver including:
a multiplexer configured to multiplex a selected codeword from a family of CDMA codes with a pilot value assigned to a link to provide a decoding value;
a multiplier configured to multiply a received signal by said decoding value; and
an accumulator configured to calculate a cross correlation product over a plurality of pilot signals based on an output of said multiplier so as to provide a channel estimation value.

16. The apparatus according to claim 14, further comprising a pilot value generator configured to generate said pilot value.

17. The apparatus according to claim 14, further comprising a codeword generator configured to generate said selected codeword.

18. An access point apparatus in a wireless communication network comprising a plurality of wireless Orthogonal Frequency Division Multiplexing/Orthogonal Frequency Division Multiple Access (OFDM/OFDMA) backhaul links, the apparatus comprising:
means for associating each of said wireless OFDM/OFDMA backhaul links with one codeword from a set of Code Division Multiple Access (CDMA) codewords to identify said link;
means for receiving, over a channel of a first one of said wireless OFDM/OFDMA backhaul links, a pilot transmission encoded using a codeword associated with a second one of said wireless OFDM/OFDMA backhaul links, wherein said encoded pilot transmission is embedded within an OFDMA symbol;
means for decoding said received pilot transmission at said first access point using said CDMA codeword associated with said second wireless OFDM/OFDMA backhaul link; and
means for estimating interference from said second wireless OFDM/OFDMA backhaul link on said first wireless OFDM/OFDMA backhaul link based on said decoded pilot transmission.

19. The apparatus of claim 18, wherein said interference comprises interference from said second wireless OFDM/OFDMA backhaul link during concurrent transmission with said first wireless OFDM/OFDMA backhaul.

20. The apparatus of claim 18, further comprising:
means for dividing a frame of OFDMA symbols into tiles, each tile including a group of time and frequency slices;
means for mapping a plurality of CDMA-encoded pilot transmissions onto a selected number of said time and frequency slice in each tile; and
means for mapping data signals without CDMA encoding onto remaining OFDMA slots in each tile.

21. The apparatus of claim 18, further comprising:
means for receiving a second pilot transmission encoded using a CDMA codeword associated with said first wireless OFDM/OFDMA backhaul link;
means for decoding said second received pilot transmission using said CDMA codeword associated with said first wireless OFDM/OFDMA backhaul link; and
means for estimating a channel response of said channel based on said decoded second received pilot transmission.

22. The apparatus of claim 18, wherein said means for estimating said channel response of said channel comprises means for calculating $\hat{H}$ for said channel by:

$$\hat{H} = \frac{1}{Np} \sum_{i=1}^{Np} C(n, i) * \frac{pr_i}{p}$$

where $\hat{H}$ denotes said channel response, * denotes a complex conjugate operation, n represents a codeword from said family of CDMA codewords assigned to a link, $Pr_i$ are received pilot signals, and Np is a number of pilot sub-carriers per resource block and a length of said codeword.

23. The apparatus of claim 18, wherein said first and second wireless OFDM/OFDMA backhaul links are associated with a cluster of access points.

24. The apparatus of claim 23, further comprising:
means for receiving a plurality of pilot transmissions at said access point, each said pilot transmission associated with a different wireless OFDM/OFDMA backhaul link within said cluster; and
means for decoding said received pilot transmissions using each of said CDMA codewords assigned to one of said OFDM/OFDMA backhaul links within said cluster.

25. The apparatus of claim 24, further comprising:
means for separately estimating an interference attributable to each OFDM/OFDMA backhaul link within said cluster based on said decoded received pilot transmissions.

26. The apparatus of claim 25, further comprising:
means for transmitting information regarding said estimated interference attributable to at least one other OFDM/OFDMA backhaul link within said cluster to a feeder node of said cluster.

27. The apparatus of claim 26, further comprising:
means for causing said feeder node to adjust backhaul link parameters of at least one OFDM/OFDMA backhaul link within said cluster based on said estimated interference.

28. The apparatus of claim 18, wherein said network comprises at least one or more of: a WiMAX network, an LTE network, a WLAN network, or an IEEE 802.20 network.

* * * * *